(12) United States Patent  
Hattori (10) Patent No.: US 6,906,906 B2  
(45) Date of Patent: Jun. 14, 2005

(54) MONOLITHIC CERAMIC CAPACITOR

(75) Inventor: Koji Hattori, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 13 days.

(21) Appl. No.: 10/794,065

(22) Filed: Mar. 8, 2004

(65) Prior Publication Data

US 2004/0179326 A1 Sep. 16, 2004

(30) Foreign Application Priority Data

Mar. 12, 2003 (JP) ........................................ 2003-066173

(51) Int. Cl.[7] ........................... H01G 4/005; H01G 4/06
(52) U.S. Cl. ..................................... 361/305; 361/321.4
(58) Field of Search ........................ 361/301.4, 303–305, 361/306.3, 309, 311, 312, 321.1, 321.2, 321.3, 321.4, 321.5, 322

(56) References Cited

U.S. PATENT DOCUMENTS

| | | | | |
|---|---|---|---|---|
| 4,030,004 A | * | 6/1977 | Rutt | 361/313 |
| 6,205,015 B1 | * | 3/2001 | Wada et al. | 361/321.4 |
| 6,335,302 B1 | * | 1/2002 | Satoh et al. | 501/137 |
| 6,362,947 B1 | * | 3/2002 | Chazono | 361/306.3 |
| 6,404,616 B2 | * | 6/2002 | Mizuno | 361/306.3 |
| 6,493,207 B2 | * | 12/2002 | Nakano et al. | 361/306.3 |

FOREIGN PATENT DOCUMENTS

| | | | | |
|---|---|---|---|---|
| JP | 64-042809 | | 2/1989 | |
| JP | 08-124787 | | 5/1996 | |
| JP | 09-186045 | | 7/1997 | |
| JP | 10-255549 | | 9/1998 | |
| JP | 2000-269066 | * | 9/2000 | ............ H01G/4/12 |

* cited by examiner

*Primary Examiner*—Eric Thomas  
(74) *Attorney, Agent, or Firm*—Dickstein, Shapiro, Morin & Oshinsky, LLP.

(57) ABSTRACT

A monolithic ceramic capacitor includes a plurality of stacked ceramic dielectric layers, thin internal conductors that are each placed between the ceramic dielectric layers and arranged in parallel, and external conductors each electrically connected to ends of the corresponding internal conductors. The ceramic dielectric layers have a thickness of about 0.5 μm to less than about 1.5 μm. The internal conductors have a thickness of about 0.1 μm to about 0.4 μm. The internal conductors each have spaces therein and the total area percentage of the spaces in each internal conductor is more than about 10% to less than about 40% of the area of the internal conductor. The ceramic dielectric layers contain a sintering additive containing Si, and the sintering additive is placed in the spaces in a segregated manner.

20 Claims, 3 Drawing Sheets

MONOLITHIC CERAMIC CAPACITOR

BACKGROUND OF THE INVENTION

1. Field of the Invention

The present invention relates to monolithic ceramic capacitors. The present invention particularly relates to a monolithic ceramic capacitor including a large number of thin dielectric layers and internal conductors each placed therebetween, wherein the dielectric layers are obtained by firing ceramic green sheets (hereinafter referred to as "ceramic sheets").

2. Description of the Related Art

In recent years, in electronics industries, monolithic ceramic capacitors including a sintered ceramic body and internal conductors placed therein have been widely used.

In such monolithic ceramic capacitors, ceramic dielectric layers (hereinafter referred to as "dielectric layers") are each placed between the internal conductors. Since there has been a demand for a decrease in size, increase in capacity, and decrease in cost, new monolithic ceramic capacitors including thin dielectric layers having a thickness of about one $\mu$m have been recently developed.

In general, a decrease in thickness of a dielectric layer reduces the number of ceramic particles placed in the thickness direction of the dielectric layer and increases the electric field applied to the dielectric layer; hence, the reliability of the dielectric layer is decreased. Therefore, in order to increase the reliability, the average size of the ceramic particles has been reduced, whereby a new barium titanate dielectric material has been developed. This material is useful for forming dielectric layers having a thickness of about one $\mu$m.

For conductive materials for forming internal conductors, a base metal such as Cu or Ni has been used instead of a noble metal such as Ag or Pd, whereby low-cost monolithic ceramic capacitors have been developed.

On the other hand, in order to increase the capacity of a monolithic ceramic capacitor, it is presumed that the dielectric layer thickness must be reduced. However, when the internal conductors are formed by an ordinary screen-printing method, there is a limit on the reduction in thickness of the internal conductors. Accordingly, a layered body including the dielectric layers and internal conductors is apt to warp.

In the layered body, when the number of the dielectric layers is large, a region having the dielectric layers and internal conductors has a thickness larger than that of another region having the dielectric layers but no internal conductors depending on the presence of the internal conductors. Accordingly, the layered body is apt to warp. Thus, the thickness of the internal conductors must be minimized.

Since a conductive paste for forming the internal conductors usually contains a powdery conductive material, an organic binder, and an organic solvent, the green internal conductors have a thickness two to three times larger than that of the fired internal conductors containing the conductive material only.

As described above, there is a limit on the reduction in thickness of the dielectric layers when the internal conductors are formed by a screen-printing method. Therefore, it is difficult to prevent warpage due to the internal conductor thickness from occurring in the layered body, and structural defects such as delaminations and cracks may occur in a step of removing the binder or in a firing step.

In order to cope with the above problem, the following technique is disclosed in Japanese Unexamined Patent Application Publications No. 64-42809 and No. 8-124787 (hereinafter referred to as Patent Documents 1 and 2, respectively). A metal layer is formed on a film by a film-forming process such as a vacuum deposition process or a sputtering process, and the resulting metal layer is then transferred to a ceramic sheet, whereby a thin, dense internal conductor is provided on the ceramic sheet.

In the technique disclosed in Patent Documents 1 and 2, since the internal conductor is formed using a thin film containing only metal, the internal conductor has an extremely small thickness; hence warpage due to the internal conductor thickness can be greatly reduced.

However, in the internal conductor prepared by the above technique, a conductive component contained in the metal film forms aggregates of microcrystals. Therefore, when the internal conductor is fired at 1,200° C. or more, the degree of sintering is excessively increased, whereby the internal conductor is caused to partially shrink and spaces are formed in the internal conductor. Therefore, the area of the substantial part of the internal conductor is decreased.

Thus, when the internal conductor is prepared using a metal film, the metal film must have a sufficient thickness to a certain extent. However, an increase in thickness of the metal film prevents a decrease in thickness of a monolithic ceramic capacitor and causes an increase in manufacturing cost. That is, according to known techniques such as one disclosed in Patent Documents 1 and 2, the dielectric layer can be reduced in thickness but the internal conductor cannot be sufficiently reduced in thickness. Therefore, there is a limit on the number of layers of the monolithic ceramic capacitor, and monolithic ceramic capacitors having a large capacitance greater than or equal to, for example, 100 $\mu$F have not been obtained.

SUMMARY OF THE INVENTION

The present invention has been made in view of the foregoing circumstances, and it is an object of the present invention to provide a monolithic ceramic capacitor that has high reliability and a large capacity and includes a large number of thin layers.

In general, in order to sinter a ceramic dielectric material such as barium titanate, such a material must be fired at a temperature higher than or equal to 1,300° C. However, the material can be sintered a lower temperature by the use of a sintering additive containing $SiO_2$. The material can be sintered a temperature lower than or equal to 1,000° C. by the use of a large amount of a sintering additive containing a $SiO_2$—$B_2O_3$—$Li_2O$ glass compound having a low melting point.

However, the use of a large amount of the sintering additive containing such a glass compound results in the segregation of the glass compound at grain boundaries, triple junctions in crystal grains, or interfaces between the dielectric layers and internal conductors. Therefore, when the dielectric layers have a small thickness, the segregation may cause a decrease in dielectric constant or reliability.

As a result of an intensive investigation, the inventors have obtained the following finding: when the internal conductors having a small thickness are formed by a thin film-forming process and spaces are formed in the internal conductors such that the total area of the spaces in each internal conductor occupies more than 10% of the area of the internal conductor, the sintering additive is segregated in the spaces but is prevented from being segregated at grain boundaries, triple junctions in crystal grains, or interfaces between the dielectric layers and internal conductors.

When the total area percentage of the spaces in each internal conductor is less than 40% of the area of the internal conductor, the area of overlapping regions of the internal conductors facing each other is insufficient to obtain a desired capacitance.

Furthermore, the inventors have obtained the following finding: in order to prevent warpage from occurring in a layered body including the dielectric layers and internal conductors, the thickness of the internal conductors must be controlled within a range of 0.1 µm to 0.4 µm and the thickness of the dielectric layers must be controlled within a range of 0.5 µm to less than 1.5 µm.

The present invention has been made based on the above findings. A monolithic ceramic capacitor of the present invention includes a plurality of stacked ceramic dielectric layers, thin internal conductors that are each placed between the ceramic dielectric layers and arranged in parallel, and external conductors each electrically connected to ends of the corresponding internal conductors. The ceramic dielectric layers have a thickness of 0.5 µm to less than 1.5 µm. The internal conductors have a thickness of 0.1 µm to 0.4 µm. The internal conductors each have spaces therein and the total area percentage of the spaces in each internal conductor is more than 10% to less than 40% of the area of the internal conductor. The ceramic dielectric layers contain a sintering additive containing Si and the sintering additive is placed in the spaces in a segregated manner.

Since the monolithic ceramic capacitor has the above configuration, the sintering additive is prevented from being segregated at grain boundaries, triple junctions in crystal grains, or interfaces between the dielectric layers and internal conductors. Therefore, the monolithic ceramic capacitor has high reliability and capacitance.

The total area percentage of the spaces in each internal conductor can be readily controlled by varying the internal conductor thickness or sintering conditions, and the internal conductor thickness can be readily controlled when the internal conductors are formed by a thin film-forming process.

Thus, in the monolithic ceramic capacitor of the present invention, the internal conductors are formed by a thin film-forming process.

In the monolithic ceramic capacitor of the present invention, the internal conductors contain a base metal material. Thus, the monolithic ceramic capacitor that includes a large number of thin layers and has a large capacitance can be manufactured at low cost.

DESCRIPTION OF THE PREFERRED EMBODIMENTS

Embodiments of the present invention will now be described in detail.

Figure 1:
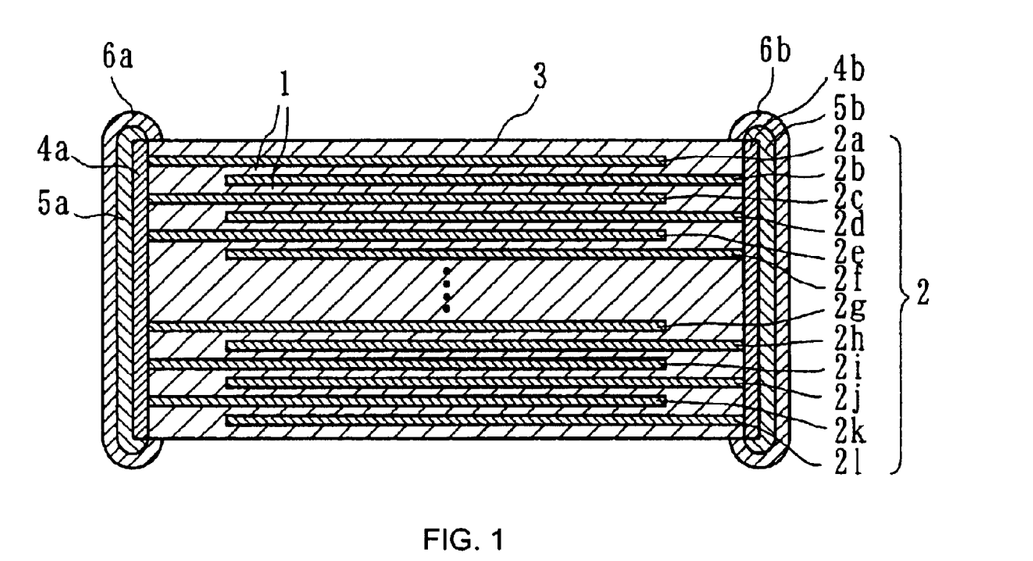
FIG. 1 is a sectional view showing a monolithic ceramic capacitor according to an embodiment of the present invention.

FIG. 1 is a sectional view showing a monolithic ceramic capacitor according to an embodiment of the present invention.

The monolithic ceramic capacitor includes a plurality of stacked dielectric layers 1 and thin internal conductors 2 that are each placed between the dielectric layers 1 and arranged in parallel. The dielectric layers 1 and internal conductors 2 have been prepared by a co-firing process and form a sintered ceramic body 3.

External conductors 4a and 4b are each placed at both ends of the sintered ceramic body 3. First metal coatings 5a and 5b are placed on the external conductors 4a and 4b, respectively, and second metal coatings 6a and 6b are placed on the first metal coatings 5a and 5b, respectively.

The internal conductors 2 are arranged in parallel in the thickness direction of the ceramic body. The internal conductors 2 are classified into first internal conductors 2a, 2c, 2e, 2g, 2i, and 2k and second internal conductors 2b, 2d, 2f, 2h, 2j, and 2l. One end of each of the first internal conductors 2a, 2c, 2e, 2g, 2i, and 2k is electrically connected to the external conductor 4a and one end of each of the second internal conductors 2b, 2d, 2f, 2h, 2j, and 2l is electrically connected to the external conductor 4b, whereby static capacitors are formed between the first internal conductors 2a, 2c, 2e, 2g, 2i, and 2k and second internal conductors 2b, 2d, 2f, 2h, 2j, and 2l, respectively.

Figure 2:
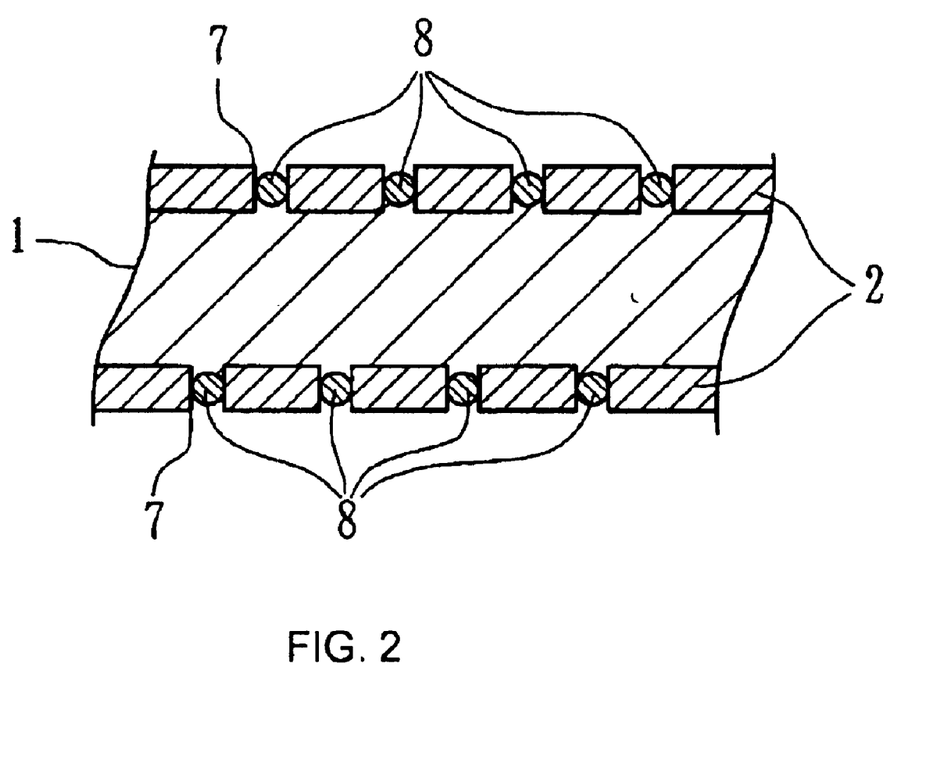
FIG. 2 is an enlarged view of the monolithic ceramic capacitor.

In this embodiment, the dielectric layers 1 have a thickness of about 0.5 µm or more to less than about 1.5 µm and the internal conductors 2 have a thickness of about 0.1 µm or more to about 0.4 µm or less. The internal conductors 2 each have spaces 7 therein as shown in FIG. 2. The total area percentage of the spaces 7 in each internal conductor 2 is more than about 10% to less than about 40% of the area of the internal conductor 2.

The reasons why the thicknesses of the dielectric layers 1 and internal conductors 2 and the area percentage of the spaces 7 are limited to the above range will now be described in detail.

(1) Thickness of Dielectric Layers

In view of the reduction in size of the monolithic ceramic capacitor, the dielectric layers 1 preferably have a small thickness. When the dielectric layers 1 have a thickness of about 1.5 µm or more, the capacitance thereof is too small to obtain monolithic ceramic capacitors having a small size and high capacitance even if the dielectric layers 1 have a large dielectric constant. In contrast, it is difficult to form dielectric layers that have a thickness of less than 0.1 µm because of technical limitations.

Thus, in the present invention, the thickness of the dielectric layers 1 is within a range of about 0.1 µm or more to less than about 1.5 µm.

(2) Thickness of Internal Conductors

Since the reduction in thickness of the internal conductors 2 is effective in reducing the size of the monolithic ceramic capacitor, the internal conductors 2 preferably have a small thickness. However, when internal conductors have a thickness of less than 0.1 µm, the internal conductors partially shrink and therefore have a decreased area even if the internal conductors are fired at a temperature lower than the melting point of a conductive material contained in the internal conductors. Therefore, the area of overlapping regions of the internal conductors facing each other is insufficient to obtain a desired capacitance. In contrast, when the internal conductors have a thickness of more than 0.4 µm, structural defects such as delaminations and cracks may occur due to an increase in warpage of a layered body including stacked dielectric layers and internal conductors in common with printed electrodes having a large thickness.

Thus, in the present invention, the thickness of the internal conductors 2 is within a range of about 0.1 μm to about 0.4 μm.

(3) Total Area Percentage of Spaces

In general, processes for producing monolithic ceramic capacitors include a step of sintering stacked dielectric layers. In order to sinter a ceramic dielectric material such as barium titanate, such a material must be usually fired at a temperature higher than or equal to 1,300° C.

The sintering temperature can be lowered by the use of a sintering additive such as $SiO_2$. That is, the above material can be sintered at a temperature lower than or equal to 1,000° C. by the use of a large amount of a low-melting sintering additive containing a $SiO_2$—$B_2O_3$—$Li_2O$ glass compound.

However, the use of a large amount of such a sintering additive containing the glass compound causes glass to be segregated at grain boundaries, triple junctions in crystal grains, or interfaces between the dielectric layers 1 and internal conductors 2. When the dielectric layers 1 have a small thickness, the dielectric constant and reliability of the monolithic ceramic capacitor are lowered due to the segregated glass.

As a result of an intensive investigation, the inventors have obtained the following findings: when the internal conductors 2 are caused to partially shrink such that the spaces 7 are formed in the internal conductors 2, the sintering additive 8 containing a glass compound principally containing Si is selectively deposited in the spaces 7 as shown in FIG. 2; the sintering additive 8 can be prevented from being segregated at grain boundaries, triple junctions in crystal grains, or interfaces between the dielectric layers 1 and internal conductors 2; and the capacitance and reliability are enhanced although the internal conductors 2 have a decreased area.

Figure 3:
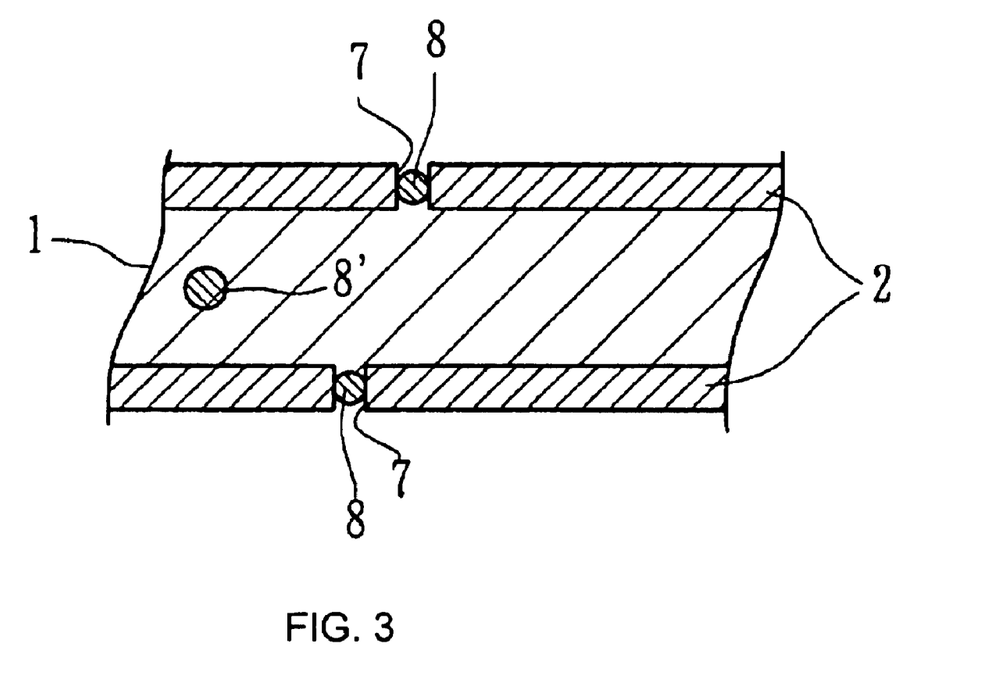
FIG. 3 is an illustration showing a sintering additive that has been segregated in a dielectric layer because the total area percentage of spaces in each internal conductor is 10% or less of the area of the internal conductor.

The internal conductors 2 can be prevented from partially shrinking by using another sintering additive that is effective in sintering a ceramic dielectric material at a lower temperature or by sintering the ceramic dielectric material at a temperature lower than the melting point of a metal component contained in the internal conductors 2. However, when the total area percentage of the spaces 7 in each internal conductor 2 is reduced to 10% or less by suppressing the formation of the spaces 7, the sintering additive 8' containing Si is segregated in the dielectric layers 1 as shown in FIG. 3.

In contrast, when the total area percentage of the spaces 7 in each internal conductor 2 is 40% or more, the area of overlapping regions of the internal conductors 2 facing each other is insufficient; hence, the monolithic ceramic capacitor has an insufficient capacitance.

Thus, in the present invention, the total area percentage of the spaces 7 in each internal conductor 2 is within a range of more than 10% to less than 40%.

A process for producing the monolithic ceramic capacitor will now be described.

Ceramic powder is prepared by a hydrolysis method or the like.

The ceramic powder contains a composite oxide, such as $BaTiO_3$ represented by the formula $ABO_3$, as a major component. The composite oxide has a perovskite structure and belongs to the tetragonal system.

When the ceramic powder contains $BaTiO_3$, an additive mixed with the ceramic powder cannot be uniformly dispersed in the ceramic particles if the mixture is fired at a low temperature. Therefore, in the monolithic ceramic capacitor, the temperature coefficient of capacitance is not satisfactory and the reliability is not high. Therefore, the monolithic ceramic capacitor having a core-shell structure and desired stable properties cannot be obtained.

When the ceramic powder contains $(Ba_{1-x}Ca_x)TiO_3$ as a major component, the ceramic powder mixed with an additive for decreasing the sintering temperature is useful for forming the monolithic ceramic capacitor having a satisfactory temperature coefficient of capacitance and high reliability if the ceramic powder is fired at a low temperature, wherein $0<x\leq0.15$. In $(Ba_{1-x}Ca_x)TiO_3$, Ba, which is an element represented by A in the formula $ABO_3$, is partly replaced with Ca.

Thus, the ceramic powder having the composition formula $(Ba_{1-x}Ca_x)TiO_3$ is preferably prepared by a hydrolysis method or the like using $BaCO_3$, $CaCO_3$, and $TiO_2$, which are raw materials, wherein $0<x\leq0.15$.

The formula A/B is defined as a molar ratio of Ba and Ca to Ti, wherein Ba and Ca are elements represented by A in the formula $ABO_3$ and Ti is an element represented by B in the formula $ABO_3$. The molar ratio A/B is stoichiometrically 1.0. In the present invention, the molar ratio A/B is preferably 0.95 to 1.05. In particular, in order to allow the ceramic powder to be nonreductive, the molar ratio A/B is preferably 1.000 to 1.035.

Crystal grains in the ceramic powder preferably have an axial ratio c/a of 1.007 to 1.010. This is because an increase in axial ratio c/a enhances the dielectric constant of the monolithic ceramic capacitor. When the axial ratio c/a is less than 1.007, the temperature coefficient of capacitance of the monolithic ceramic capacitor is not satisfactory.

In the monolithic ceramic capacitor of this embodiment, the dielectric layers 1 have a thickness of less than 1.5 μm as described above. In order to prepare the dielectric layers 1 with a small thickness, the average particle size of the ceramic powder is preferably fine and uniform.

When the ceramic powder has an average particle size of less than 50 nm, the ceramic powder violently reacts with the additive; hence the fired dielectric layers 1 have a large average particle size, which causes deterioration in temperature coefficient and voltage coefficient of capacitance.

In contrast, when the ceramic powder has an average particle size of more than 250 nm, the ceramic powder has low reactivity with the additive and cannot therefore be sintered at a low temperature. Furthermore, the spaces 7 in each internal conductor 2 have an excessively large area, which causes a decrease in capacitance and deterioration in electrical property. Therefore, monolithic ceramic capacitors having high reliability cannot be obtained. Thus, the ceramic powder preferably has an average particle size of 50 nm to 250 nm.

Next, the following additives are prepared: a sintering additive containing $SiO_2$, a $SiO_2$—$B_2O_3$ compound, or a $SiO_2$—$B_2O_3$—$Li_2O$—BaO compound; a compound additive containing a rare-earth element, Ba, Ca, Zr, Mn, Mg, Si, B, Al, or Li. These additives are uniformly mixed with the ceramic powder dispersed in an organic solvent, and the mixture is dried and then heated such that the organic solvent is removed from the mixture, whereby ceramic ingredient powder is prepared.

A predetermined amount of a binder, plasticizer, and organic solvent are mixed with the ceramic ingredient powder in a ball mill by a wet process, whereby ceramic slurry is prepared. The ceramic slurry is then formed into ceramic sheets by a known method such as a doctor blade method.

On the other hand, metal films for forming the internal conductors 2 are prepared by a thin film-forming process such as a vacuum vapor deposition process, a sputtering process, a chemical vapor deposition (CVD) process, an electroplating process, or an electroless plating process.

That is, a metal layer is formed on a polyethylene terephthalate film (hereinafter referred to as a PET film) by the above process. The resulting metal layer is patterned using a resist material, whereby the metal films are formed on the PET film.

Since the internal conductors 2 are prepared using the metal films, a difference in thickness between the following portions of a layered body including the ceramic sheets and the metal films can be reduced: a portion having the metal films and another portion having no metal films. Therefore, structural defects can be prevented from occurring in the layered body if the layered body includes a large number of layers.

The metal films may contain a noble metal material such as Ag or Ag—Pd. The use of such a material results in an increase in manufacturing cost of the monolithic ceramic capacitor having a large capacity. Thus, in order to manufacture the monolithic ceramic capacitor at low cost, a base metal such as Cu or Ni is preferably used for forming the metal films.

The total area percentage of the spaces 7 in each internal conductor 2 can be controlled by varying the thickness of the internal conductor 2 or changing a material (conductive material) for the metal films. The thickness of the internal conductor 2 can be readily controlled by preparing the internal conductor 2 by a thin film-forming process.

The metal films preferably have a surface roughness of 5 nm to 50 nm. The metal films having such a surface roughness are useful for preparing elements having high reliability when the ceramic sheets have a small thickness.

The metal films are each thermally transferred to the corresponding ceramic sheets, whereby the internal conductors 2 are each formed on the corresponding ceramic sheets.

A large number of the ceramic sheets each having the corresponding internal conductors 2 are stacked such that connections of the internal conductors 2 extending outside are alternately arranged, whereby the layered body is prepared.

The binder is removed from the layered body, and the resulting layered body is fired under an oxygen partial pressure of $10^{-9}$ MPa to $10^{-12}$ MPa in a reductive atmosphere containing $H_2$, $N_2$, and $H_2O$, whereby the sintered ceramic body 3 is prepared.

A conductive paste containing Ag as a major component and also containing, for example, a $B_2O_3$—$Li_2O$—$SiO_2$—BaO glass compound is applied onto both end faces of the sintered ceramic body 3. The resulting sintered ceramic body 3 is then fired, whereby the external conductors 4a and 4b (as shown in FIG. 1) are each formed on the corresponding end faces.

A conductive material contained in the internal conductors 2 or external conductors 4a and 4b is not particularly limited. The internal conductors 2 and external conductors 4a and 4b may contain the same material, for example, a base metal.

The first metal coatings 5a and 5b (as shown in FIG. 1) are formed on the external conductors 4a and 4b, respectively, and the second metal coatings 6a and 6b (as shown in FIG. 1) are formed on the first metal coatings 5a and 5b, respectively, by an electroplating process, whereby the monolithic ceramic capacitor is obtained.

As described above, in this embodiment, the thickness of the dielectric layers 1 is limited to a predetermined range, the thickness of the internal conductors 2 is limited to a predetermined range, the total area percentage of the spaces 7 in each internal conductor 2 is limited to a range of more than 10% to less than 60%, and the sintering additive 8 is deposited in the spaces 7, whereby the glass compound contained in the sintering additive 8 is prevented from being segregated at grain boundaries, triple junctions in crystal grains, or interfaces between the dielectric layers 1 and internal conductors 2. Therefore, the monolithic ceramic capacitor that has high reliability and a large capacity and includes a large number of thin layers can be obtained.

EXAMPLES

Examples of the present invention will now be described in detail.

A titanate compound having the composition formula $(Ba_{0.94}Ca_{0.06})TiO_3$ was prepared by a hydrolysis method. The titanate compound was calcined at 800° C. to 1,000° C. in the air and then crushed, whereby three types of titanate powders A, B, and C were prepared. The titanate powders had an average particle size of 75 nm to 180 nm and an axial ratio c/a of 1.007 to 1.009.

Table 1 shows the calcination temperature, average particle size, and axial ratio c/a of the titanate powders.

TABLE 1

| Titanate Powders | Calcination Temperature (° C.) | Average Particle Size (nm) | Axial Ratio c/a (—) |
|---|---|---|---|
| A | 800 | 75 | 1.007 |
| B | 900 | 100 | 1.007 |
| C | 1000 | 180 | 1.009 |

The following additives were prepared: an additive containing metal soap containing Y, Mg, Mn, Ba, or Li; and a sintering additive containing an alkoxide compound containing a $SiO_2$—$B_2O_3$ glass component. The additives were added to each titanate powder dispersed in an organic solvent and they were uniformly mixed. Each mixture was dried and then heated such that the organic solvent was completely removed from the mixture, whereby each ceramic ingredient powder was prepared.

The following materials were mixed in a ball mill by a wet process: 100 parts by weight of the ceramic ingredient powder; 12 parts by weight of a polyvinyl butyral binder; 4 parts by weight of dioctyl phthalate (DOP), which functions as a plasticizer; and 100 parts by weight of ethanol, which functions as an organic solvent. Each type of ceramic slurry was prepared by the above operation.

The ceramic slurry was formed into rectangular ceramic sheets having a thickness of 0.7 $\mu$m to 2.0 $\mu$m by a doctor blade method.

Three types of internal conductors containing Ni—Cu, Ni—B, or Ni were each formed on the corresponding ceramic sheets.

In the above step, the Ni—Cu internal conductors were formed according to the procedure below.

A Cu thin layer having a thickness of about 30 nm was formed on a PET film by a vacuum vapor deposition method and a Ni thin layer was formed thereon by an electroplating method. The Cu and Ni thin layers were patterned using a resist, whereby Ni—Cu films having a thickness of 0.1 to 0.5 $\mu$m were prepared. The Ni—Cu films were each transferred to the corresponding ceramic sheets, whereby the Ni—Cu internal conductors were prepared.

The Ni—B internal conductors were formed according to the procedure below.

A Ag thin layer having a thickness of about 10 nm was formed on a PET film by a vacuum vapor deposition method and then patterned, whereby Ag films were formed. Ni—B films, having a thickness of 0.12 to 0.4 μm, containing 1 percent by weight of B were each formed on the corresponding Ag films by an electroless plating method. The Ni—B films were each transferred to the corresponding ceramic sheets, whereby the Ni—B internal conductors were prepared.

The Ni internal conductors were prepared according to the following procedure: Ni films having a thickness of 0.13 to 0.4 μm were each formed on the corresponding ceramic sheets by a sputtering process and then patterned.

According to the above procedures, the internal conductors containing Ni—Cu, Ni—B, or Ni were each provided on the corresponding ceramic sheets prepared using any one of the titanate powders A, B, and C shown in Table 1. Fifty one of the ceramic sheets, prepared using any one of the titanate powders A, B, and C, having the internal conductors containing Ni—Cu, Ni—B, or Ni were stacked such that connections of the internal conductors extending outside are alternately arranged. A plurality of the ceramic sheets having no internal conductors were placed on and under the stacked ceramic sheets. This procedure was repeated, whereby layered bodies each including the 51 ceramic sheets having the internal conductors were prepared.

The layered bodies were placed on a zirconia setter and then heated to 400° C. in a pressurized degreasing furnace, whereby the binder was removed from the layered bodies by combustion. The resulting layered bodies were fired at 950° C. to 1,000° C. for two hours in a reductive atmosphere, containing $H_2$, $N_2$, and $H_2O$, having a oxygen partial pressure of $10^{-9}$ to $10^{-12}$ MPa, whereby sintered ceramic bodies were prepared.

A conductive paste containing Ag as a major component and a $B_2O_3$—$Li_2O$—$SiO_2$—$BaO$ glass compound was applied onto both end faces of each sintered ceramic body, which was then fired at 600° C. in a nitrogen atmosphere, whereby external electrodes were formed. According to this procedure, monolithic ceramic capacitors, which are referred to as Samples 1 to 20, were obtained.

The monolithic ceramic capacitors had a width of 1.6 mm and a height of 3.2 mm, and the internal conductors each had an electrode area of $3.94 \times 10^{-6}$ $m^2$.

The monolithic ceramic capacitors were investigated for the thickness of the dielectric layers, the thickness of the internal conductors, the total area percentage of spaces in each internal conductor, structural defects, the segregation of Si in the dielectric layers, the capacitance, and the average life under high temperature conditions.

In the above investigation, the thickness of the dielectric layers and internal conductors was determined by observing a polished face of each monolithic ceramic capacitor using a microscope with a magnification of 10,000×.

The total area percentage of the spaces in each internal conductor was determined by the following procedure: the internal conductors were peeled off from the dielectric layers, a photograph of each internal conductor having the spaces therein was taken using a camera equipped with a microscope with a magnification of 500×, and the photograph was then subjected to image analysis.

The structural defects were observed by the following procedure: five of the monolithic ceramic capacitors were bound with a resin, the resulting monolithic ceramic capacitors were polished, and a polished face was observed using a microscope with a magnification of 500×, whereby the face was visually inspected whether there are delaminations or cracks.

The segregation of Si in the dielectric layers was evaluated by determining the distribution of Si using a wavelength dispersive X-ray (WDX) microanalyzer.

The capacitance was measured with an automatic bridge capacitance meter.

The average life under high temperature conditions was determined by the following procedure: a direct voltage of 5 V was applied to each monolithic ceramic capacitor at 150° C. and the variation in insulation resistance with time was measured, whereby the time elapsed until the insulation resistance is decreased to $10^5 \Omega$ or less was determined.

Table 2 shows measurement results.

TABLE 2

| Samples[1] | Titanete Powder | Material of Internal Conductor | Thickness (μm) Dielectric Layer | Thickness (μm) Internal | Total Area Percentage of Spaces in Internal Conductor (%) | Segregation of Si in Dielectric Layer[2] | Structural Defects[2] | Capacitance (μF) | Average Life (hr) |
|---|---|---|---|---|---|---|---|---|---|
| 1 | A | Ni—Cu | 0.5 | 0.20 | 75 | NO | NO | 4.3 | 70 |
| 2 | B | Ni—Cu | 0.8 | 0.20 | 75 | NO | NO | 5.4 | 73 |
| 3 | C | Ni—Cu | 1.0 | 0.20 | 75 | NO | NO | 4.3 | 71 |
| 4* | C | Ni—Cu | 1.5 | 0.20 | 75 | NO | NO | 3.2 | 80 |
| 5* | C | Ni—Cu | 1.0 | 0.10 | 40 | NO | NO | 2.2 | 72 |
| 6* | C | Ni—Cu | 1.0 | 0.13 | 55 | NO | NO | 3.2 | 73 |
| 7 | C | Ni—Cu | 1.0 | 0.15 | 70 | NO | NO | 4.0 | 75 |
| 8 | C | Ni—Cu | 1.0 | 0.20 | 75 | NO | NO | 4.2 | 78 |
| 9 | C | Ni—Cu | 1.0 | 0.40 | 85 | NO | NO | 4.6 | 79 |
| 10* | C | Ni—Cu | 1.0 | 0.50 | 80 | NO | SO | 4.2 | 74 |
| 11 | C | Ni—B | 1.0 | 0.13 | 70 | NO | NO | 4.0 | 74 |
| 12 | C | Ni—B | 1.0 | 0.15 | 80 | NO | NO | 4.5 | 77 |
| 13 | C | Ni—B | 1.0 | 0.20 | 80 | NO | NO | 4.5 | 78 |
| 14 | C | Ni—B | 1.0 | 0.40 | 90 | NO | NO | 4.4 | 76 |
| 15 | C | Ni | 1.0 | 0.13 | 70 | NO | NO | 4.0 | 76 |
| 16 | C | Ni | 1.0 | 0.15 | 75 | NO | NO | 4.1 | 77 |
| 17 | C | Ni | 1.0 | 0.20 | 85 | NO | NO | 4.6 | 81 |
| 18* | C | Ni | 1.0 | 0.40 | 95 | O | NO | 3.9 | 63 |
| 19 | C | Ni—Cu | 1.0 | 0.20 | 80 | NO | NO | 4.0 | 70 |
| 20 | C | Ni—Cu | 1.0 | 0.20 | 70 | NO | NO | 4.0 | 79 |

TABLE 2-continued

| | | Material | Thickness (μm) | | Total Area Percentage of | Segregation of Si | | | |
|---|---|---|---|---|---|---|---|---|---|
| Samples[1] | Titanete Powder | of Internal Conductor | Dielectric Layer | Internal | Spaces in Internal Conductor (%) | in Dielectric Layer[2] | Structural Defects[2] | Capacitance (μF) | Average Life (hr) |

[1]Samples with an asterisk are out of the scope of the present invention.
[2]NO represents the term "not observed", O represents the term "observed", and SO represents the term "slightly observed".

With reference to Table 2, for Sample 4, the dielectric layers of Sample 4 have a thickness of 1.5 μm and the capacitance is 3.2 μF. That is, the dielectric layers have a large thickness and Sample 4 therefore has a small capacitance. In order to increase the capacitance of Sample 4, the number of the dielectric layers must be increased, which results in an increase in thickness of Sample 4 and increase in manufacturing cost.

For Samples 5 and 6, the total area percentage of spaces in each internal conductor is 40% or more of the area of the internal conductor. Samples 5 and 6 have capacitances of 2.2 and 3.2, respectively. That is, the total area percentage is small and Samples 5 and 6 therefore has a small capacitance. In order to increase the capacitance of Samples 5 and 6, in common with Sample 4, the number of the dielectric layers of Samples 5 and 6 must be increased, which results in an increase in thickness of Samples 5 and 6 and an increase in manufacturing cost.

For Sample 10, the internal conductors have a thickness of 0.50 μm. Since the internal conductors have a large thickness, a layered body including the internal conductors has a large warpage. Therefore, there are cracks and structural defects in Sample 10.

For Sample 18, the total area percentage of the spaces in each internal conductor is 10% or less and the capacitance is 3.9 μF. Since the total area percentage is small, there are heterogeneous phases containing Si in the dielectric layers and the capacitance is small. Therefore, the reliability is low.

In contrast, for Samples 1 to 3, 7 to 9, 11 to 17, 19 and 20, the thickness of the dielectric layers and internal conductors and the total area percentage of the spaces in each internal conductor are within the scope of the present invention. Therefore, there is no segregation of Si in the dielectric layers and there are no structural defects such as delaminations and cracks in these samples. Furthermore, the samples have satisfactory properties. That is, the capacitance is 4 μF or more and the average life under high temperature conditions is 70 hours or more. In all of these samples, it has been confirmed by WDX analysis that there is a segregation of the sintering additive containing Si in the spaces.

As described above, in the examples of the present invention, since the internal conductors have a sufficiently small thickness, that is, a thickness of 0.1 μm to 0.4 μm, warpage can be prevented from occurring in a layered body including the internal conductors. Furthermore, since the total area percentage of the spaces in each internal conductor is more than 10% to less than 40% of the area of the internal conductor, there is no segregation of the sintering additive containing Si in the dielectric layers and electrical properties can therefore be prevented from being deteriorated. Thus, the internal conductors are fit for monolithic ceramic capacitors that include a large number of thin layers and have a large capacitance. For example, a multilayer monolithic ceramic capacitor, prepared using dielectric layers and internal conductors that are the same as those of Sample 14, including 1,200 layers has a length of 3.2 mm, a width of 1.6 mm, and a thickness of 1.6 mm and also has a capacitance of 100 μF, which is sufficiently large.

In Sample 6, the total area percentage of the spaces in each internal conductor is 55%. In Sample 11, the percentage is 70%. In Sample 15, the percentage is 70%. That is, the percentages are different from each other although all the internal conductors have a thickness of 0.13 μm. This is because metals each contained in the corresponding internal conductors of Samples 6, 11, and 15 have different melting points. Thus, the total area percentage of the spaces can be controlled by varying the thickness of the internal conductors and the type of metal contained in the internal conductors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A monolithic ceramic capacitor comprising:
   a plurality of stacked ceramic dielectric layers;
   a plurality of internal conductors, each internal conductor of the plurality of internal conductors placed between respective ceramic dielectric layers of the plurality of stacked ceramic dielectric layers and arranged in parallel; and
   external conductors each electrically connected to respective ends of corresponding internal conductors,
   wherein the ceramic dielectric layers have a thickness of about 0.5 μm to less than about 1.5 μm, the internal conductors have a thickness of about 0.1 μm to about 0.4 μm, the internal conductors each have spaces therein, a total area percentage of the spaces in each internal conductor is more than about 10% to less than about 40% of an area of the internal conductor, the ceramic dielectric layers contain a sintering additive containing Si, and the sintering additive is deposited in the spaces of the internal conductors.

2. The monolithic ceramic capacitor according to claim 1, wherein the internal conductors are film-formed internal conductors.

3. The monolithic ceramic capacitor according to claim 2, wherein the internal conductors contain a base metal material.

4. The monolithic ceramic capacitor according to claim 3, wherein the base metal is one of Cu and Ni.

5. The monolithic ceramic capacitor according to claim 1, wherein the internal conductors contain a base metal material.

6. The monolithic ceramic capacitor according to claim 5, wherein the base metal is one of Cu and Ni.

7. The monolithic ceramic capacitor according to claim 1, wherein the sintering additive is deposited in the spaces of the internal conductor in a segregated manner.

8. The monolithic ceramic capacitor according to claim 1, wherein the sintering additive is not segregated at grain boundaries.

9. The monolithic ceramic capacitor according to claim 1, wherein the sintering additive is not segregated at triple junctions in crystal grains.

10. The monolithic ceramic capacitor according to claim 1, wherein the sintering additive is not segregated at interfaces between the dielectric layers and the internal conductors.

11. The monolithic ceramic capacitor according to claim 1, wherein the ceramic dielectric layers are formed from a ceramic powder having an average particle size in the range of 50 nm to 250 nm.

12. The monolithic ceramic capacitor according to claim 11, wherein the ceramic powder contains a composite oxide represented by the formula $ABO_3$.

13. The monolithic ceramic capacitor according to claim 12, wherein the composite oxide has a perovskite structure and belongs to the tetragonal system.

14. The monolithic ceramic capacitor according to claim 12, wherein a molar ratio of A/B is 0.95 to 1.05.

15. The monolithic ceramic capacitor according to claim 14, wherein the molar ratio of A/B is 1.000 to 1.035.

16. The monolithic ceramic capacitor according to claim 11, wherein crystal grains in the ceramic powder have an axial ratio c/a of 1.007 to 1.010.

17. The monolithic ceramic capacitor according to claim 1, wherein the internal conductors have a surface roughness of 5 nm to 50 nm.

18. The monolithic ceramic capacitor according to claim 1, wherein the plurality of internal conductors are arranged to alternately connect to the external conductors.

19. The monolithic ceramic capacitor according to claim 1, wherein a first metal coating is formed on a surface of the external conductors.

20. The monolithic ceramic capacitor according to claim 19, wherein a second metal coating is formed on a surface of the first metal coating.

* * * * *